(12) United States Patent
McGiverin et al.

(10) Patent No.: US 11,567,662 B2
(45) Date of Patent: Jan. 31, 2023

(54) STORAGE SYSTEM INTERFACE

(71) Applicant: NetApp Inc., San Jose, CA (US)

(72) Inventors: Brian Joseph McGiverin, Durham, NC (US); Christopher Michael Morrissey, Apex, NC (US); Daniel Andrew Sarisky, Cary, NC (US); Santosh C. Lolayekar, Saratoga, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/549,031

(22) Filed: Dec. 13, 2021

(65) Prior Publication Data

US 2022/0100376 A1    Mar. 31, 2022

Related U.S. Application Data (60) Continuation of application No. 16/683,561, filed on Nov. 14, 2019, now Pat. No. 11,199,969, which is a division of application No. 14/980,522, filed on Dec. 28, 2015, now Pat. No. 10,509,564.

(51) Int. Cl.
  *G06F 3/06* (2006.01)
(52) U.S. Cl.
  CPC ............ *G06F 3/0604* (2013.01); *G06F 3/067* (2013.01); *G06F 3/0644* (2013.01)
(58) Field of Classification Search
  None
  See application file for complete search history.

(56) References Cited

U.S. PATENT DOCUMENTS

| | | | |
|---|---|---|---|
| 5,915,253 A * | 6/1999 | Christiansen | G06F 16/10 |
| 7,610,548 B1 | 10/2009 | Brinkman et al. | |
| 8,073,814 B2 * | 12/2011 | Cosby | G06Q 10/10 |
| | | | 707/627 |
| 2004/0006765 A1 * | 1/2004 | Goldman | G06F 9/4492 |
| | | | 717/109 |
| 2005/0010580 A1 | 1/2005 | Lancefield | |
| 2006/0074975 A1 * | 4/2006 | Tunar | G06F 3/0632 |
| 2009/0125700 A1 * | 5/2009 | Kisel | G06F 12/023 |
| | | | 711/170 |
| 2013/0159637 A1 * | 6/2013 | Forgette | G06F 3/067 |
| | | | 711/E12.001 |
| 2014/0137081 A1 | 5/2014 | Kohli et al. | |
| 2015/0269000 A1 | 9/2015 | Alexeev et al. | |
| 2016/0217202 A1 | 7/2016 | Klahre et al. | |
| 2016/0259586 A1 | 9/2016 | Tylik et al. | |

OTHER PUBLICATIONS

International Search Report and Written Opinion for Application No. PCT/US2016/068961 dated Apr. 11, 2017, 8 pages.

* cited by examiner

*Primary Examiner* — Tracy C Chan (74) *Attorney, Agent, or Firm* — Cooper Legal Group, LLC (57) ABSTRACT

A request to generate a storage system model is received. The storage system model represents at least a portion of a storage system. In response to receiving the request, a storage system interface configuration is loaded. The storage system interface configuration comprises an attribute of an entity model. The attribute corresponds to an attribute of a storage system entity of the storage system. Further in response to receiving the request, the entity model is identified as representing the storage system entity. In response to identifying the entity model as representing the storage system entity, the entity model is instantiated.

20 Claims, 7 Drawing Sheets

STORAGE SYSTEM INTERFACE

RELATED APPLICATIONS

This application claims priority to and is a continuation of U.S. application Ser. No. 16/683,561, filed on Nov. 14, 2019, now allowed, titled "STORAGE SYSTEM INTERFACE," which claims priority to and is a divisional of U.S. Pat. No. 10,509,564, filed on Dec. 28, 2015 and titled "STORAGE SYSTEM INTERFACE," which are incorporated herein by reference.

BACKGROUND

The disclosure generally relates to the field of storage systems, and more particularly to facilitating operations associated with a storage system.

Storage systems can include a variety of components, such as storage controllers, storage devices, etc. The components can vary greatly between different storage systems. Further, components can be added to existing storage systems or existing components may be replaced by different components. Even when components of a storage system are similar, functionality may not be consistent across the components. For example, two different storage devices may support different functionality based on when they were respectively released, what version firmware each has, etc.

Even when components support standard protocols, various manufacturers may include additional functionality that extends the standard protocols. Further, protocols may be specified at a high level, allowing the low level implementation to vary. Thus, when designing components outside of the storage system, such as management applications, client interfaces, etc., accounting for the large number of potential variations can be an arduous task.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. In some instances, well-known instruction instances, protocols, structures and techniques have not been shown in detail in order not to obfuscate the description.

Clients communicate with storage systems over networks, via a direct connections, etc. A storage system interface provides a programmatic mechanism for the client to communicate with a storage system. For example, an application on a client may request that a particular command be issued to a storage system by indicating the command to a storage system interface. To identify the command, an application might call a particular function/method, pass a particular parameter to the storage system interface, etc.

The storage system interface can be based, at least in part, on a storage system model. A storage system model includes models of storage system entities (entity models), such as storage controllers, storage devices, etc. Each entity model includes representations of various attributes of the corresponding storage system entity. For example, an entity model for a storage controller might include identifying data (e.g., manufacturer, model, serial number, etc.), static configuration data (e.g., the count and types of physical ports on the device, amount of memory installed, etc.), and dynamic configuration data (e.g., storage volume configuration data, service level objective configurations, etc.). An entity model can also provide an interface to perform various operations on the particular entity. For example, an entity model for a storage controller might include functionality that allows a component to modify dynamic configuration data, restart the storage controller, etc.

The storage system model can include various levels of abstraction as well. For example, storage devices generally include the ability to read data from and write data to the particular storage device. The storage system model might have a generic storage device entity model that includes attributes common to storage devices, such as read and write operations. However, some storage devices may include other attributes or perform operations differently from other storage devices. For example, some storage devices may be RAID ("Redundant Array of Inexpensive Disks" or "Redundant Array of Independent Disks") devices, which may provide the ability to configure a RAID level. Thus, the storage system model may include a RAID storage device entity model that includes attributes common to RAID devices.

Some of the entity models form hierarchical relationships. For example, a RAID storage device entity model may extend the generic storage device model. In other words, the RAID storage device entity model includes the attributes and operations of the generic storage device model (e.g., amount of storage available, read and write operations, etc.) and includes additional characteristics and attributes not present in the generic storage device model (e.g., RAID level configuration). The specific relationships between the entity models can vary depending on the storage system entities supported by the storage system itself, the characteristics of the storage system entities, etc. For example, a storage device entity model hierarchy might include the generic storage device entity model extended by a block storage device entity model, which may be extended by a storage device entity model for a specific manufacturer, etc.

The hierarchical storage system model allows multiple entity models to share some functionality without duplicating the functionality. For example, if a generic storage device entity model includes the functionality for performing read and write operations on a storage device, any entity model that extends the generic storage device entity model can inherit the functionality. Thus, all entity models that extend the generic storage device entity model include the attributes and operations of the generic storage device entity model, allowing for those characteristics and attributes to be implemented once but be available to multiple entity models. Further, if a particular storage system entity implements functionality differently, the associated entity model can override the implementation of an entity model it extends. For example, if the operations to perform a read operation on a storage device manufactured by Manufacturer A are different than other storage devices, the entity model for storage devices manufactured by Manufacturer A may override the implementation of the read operation in the generic storage device entity model.

The hierarchical storage system model also allows for a flexible combination of simplicity and complexity. For example, consider a scenario in which a component that uses the storage system interface writes data to a storage device. The component can pass a storage device identifier to the storage system interface. The storage system interface identifies the storage device based on the storage device identifier, identifies a corresponding entity model, and provides the entity model to the component. Because the component is only writing data to the storage device, the component can treat the entity model as a generic storage device entity model and need not know anything about that actual implementation. For example, the entity model returned may be an entity model for a storage device manufactured by Manufacturer A, but because the entity model extends the generic storage device entity model, the actual implementation is transparent to the component and the component can perform operations as if the entity model was merely a generic storage device entity model. However, because the entity model is an entity model corresponding to the storage device manufactured by Manufacturer A, the component can take advantage of specific attributes provided by the more specific entity model as well.

When the storage system interface is instantiated (and, in some instances, periodically thereafter), the storage system interface reads an interface configuration. The interface configuration can be one or more files located on a disk, stored in memory, provided as a set of parameters, etc. The interface configuration may have little or no data about the storage system configuration; if the interface configuration includes data about the storage system configuration, the interface configuration might need to be updated each time the storage system configuration changed. Instead, the storage system interface can dynamically determine the storage system configuration and dynamically generate a corresponding storage system model. However, the interface configuration may include some data about the storage system configuration. For example, the interface configuration may include an identifier of a particular component that the storage system interface can use to determine the configuration of the storage system. For example, the interface configuration may include an Internet Protocol (IP) address for a managing node or primary storage controller. As another example, the interface configuration may include data that facilitates the identification of particular components that may be present in a storage system, such as model identifiers.

As described above, storage system entities can have various attributes. In some instances, the storage system interface determines the attributes by querying the particular storage system entity (e.g., over a network). If a particular attribute is not typically used by the storage system interface (or a component utilizing the storage system interface), determining the attribute may use storage system and network resources unnecessarily. To reduce the unnecessary determination of attributes, the interface configuration can include data specifying whether various attributes of a storage system entity should be determined when a corresponding entity model is instantiated or, alternatively, when the particular attribute is requested (e.g., on demand). Additionally, because the interface configuration can be reloaded at various points during operation of the storage system, the specific attributes that are loaded on demand can be changed at runtime.

Once the interface configuration is read, the storage system interface dynamically generates the storage system model. To generate the storage system model, the storage system interface performs one or more discovery operations to determine the components of the storage system. For example, the storage system interface may request data from a storage controller identified when the storage system interface was instantiated. The requested data may include a device identifier, manufacturer, model identifier, media access control (MAC) address, etc. Once the storage system interface receives the requested data, the storage system interface identifies a corresponding entity model. For example, the storage system interface may use the requested data, such as the manufacturer and model number, to search a look up table for a corresponding entity model. Once the corresponding entity model is determined, the storage system interface instantiates the corresponding entity model.

The discovery operations can be repeated until the storage system model is built. For example, once an entity model is instantiated for a storage controller, the storage system interface may use the entity model to request a list of identifiers that identify storage devices coupled with the storage controller. Once the storage system interface receives the list of identifiers, the storage system interface can perform similar operations to those used to identify the entity model for the storage controller. Additionally, the generation of the storage system model can be performed on demand, similar to the retrieval of attributes. For example, the interface configuration may specify that storage devices are to be discovered on demand. Thus, the storage system interface may not request a list of identifiers from the storage controller until the storage system interface receives a request pertaining to the storage devices.

As described above, the entity models within the storage system model can have hierarchical relationships. Any of the entity models in a particular hierarchy may include a particular attribute or implement a particular operation. For example, from the perspective of a component using the storage system interface, an entity model lower in the hierarchy (hereinafter "child entity model") includes the attributes and implements the operations of entity models higher in the hierarchy (hereinafter "parent entity models"). However, it may be one of the parent entity models that actually includes the attributes and implements the operations. In some instances, both a child entity model and a parent entity model may include the same attribute or implement the same operation. In such instances, the child entity model "overrides" the parent entity model implementation. Even if the child entity model overrides a parent entity model, the child entity model may pass control to the parent entity model. For example, if a particular storage device allows for additional parameters to be sent with a write operation, a child entity model corresponding to the storage device may add the additional parameters to a parameter set, and then may pass control to a parent entity model that implements the write operation.

When the storage system interface receives a request to retrieve an attribute or perform an operation, the storage system interface searches the appropriate hierarchy in the storage system model to locate the implementation of the attribute or operation. Thus, when the storage system interface receives the request, the storage system interface identifies the particular entity model that the request targets. For example, a component that uses the storage system interface may request that a write operation be performed on an entity model that represents a particular storage device. The storage system interface would thus identify the entity model that represents the particular storage device as being the target entity model.

Once the storage system interface identifies the target entity model, the storage system interface traverses the hierarchy associated with the target entity model until the storage system interface locates the implementation of the requested attribute or operation. Thus, for example, the storage system interface first determines whether the target entity model itself implements the particular attribute or operation. If the target entity model does not implement the particular attribute or operation, the storage system interface identifies one or more parent entity models. The storage system interface can then determine whether one of the parent entity models implements the particular attribute or operation. If none of the parent entity models implement the particular attribute or operation, the storage system interface can continue to traverse the hierarchy until an implementation of the attribute or operation is found. If an implementation of the particular attribute or operation is found, the storage system interface can perform appropriate operations. For example, the storage system interface may call a function associated with the entity model that implements the particular attribute or operation. If an implementation of the attribute or operation is not found, the storage system interface can indicate that an error occurred.

The storage system model can simplify operations from the perspective of a component using the storage system interface by encapsulating more complex operations. Consider the creation of a logical unit number (LUN), for example. A LUN is a logical unit of physical storage. The creation of a LUN may include multiple steps, such as selecting the underlying physical storage (or logical storage, in some instances), mapping initiators (e.g., hosts) to the LUN, etc. However, a first entity model representing a first storage system may implement a single LUN creation operation (e.g., function or method) that accepts parameters for the LUN. When the LUN creation operation is called, the first entity model performs the individual steps. However, the individual operations to create the LUN are hidden from the calling component. Further, a second storage system may implement a different process for creating a LUN. A second entity model associated with the second storage system can include a LUN creation operation that conforms to the same interface definition as the LUN creation operation of the first entity model, but performs the operations specific to the second storage system. Thus, the actual performance of the LUN creation is delegated to an entity model that corresponds to the particular storage system. Because the entity models conform to the same (or similar) interface definition, the calling component need not be aware of the particular operations specific to the different storage systems.

Figure 1:
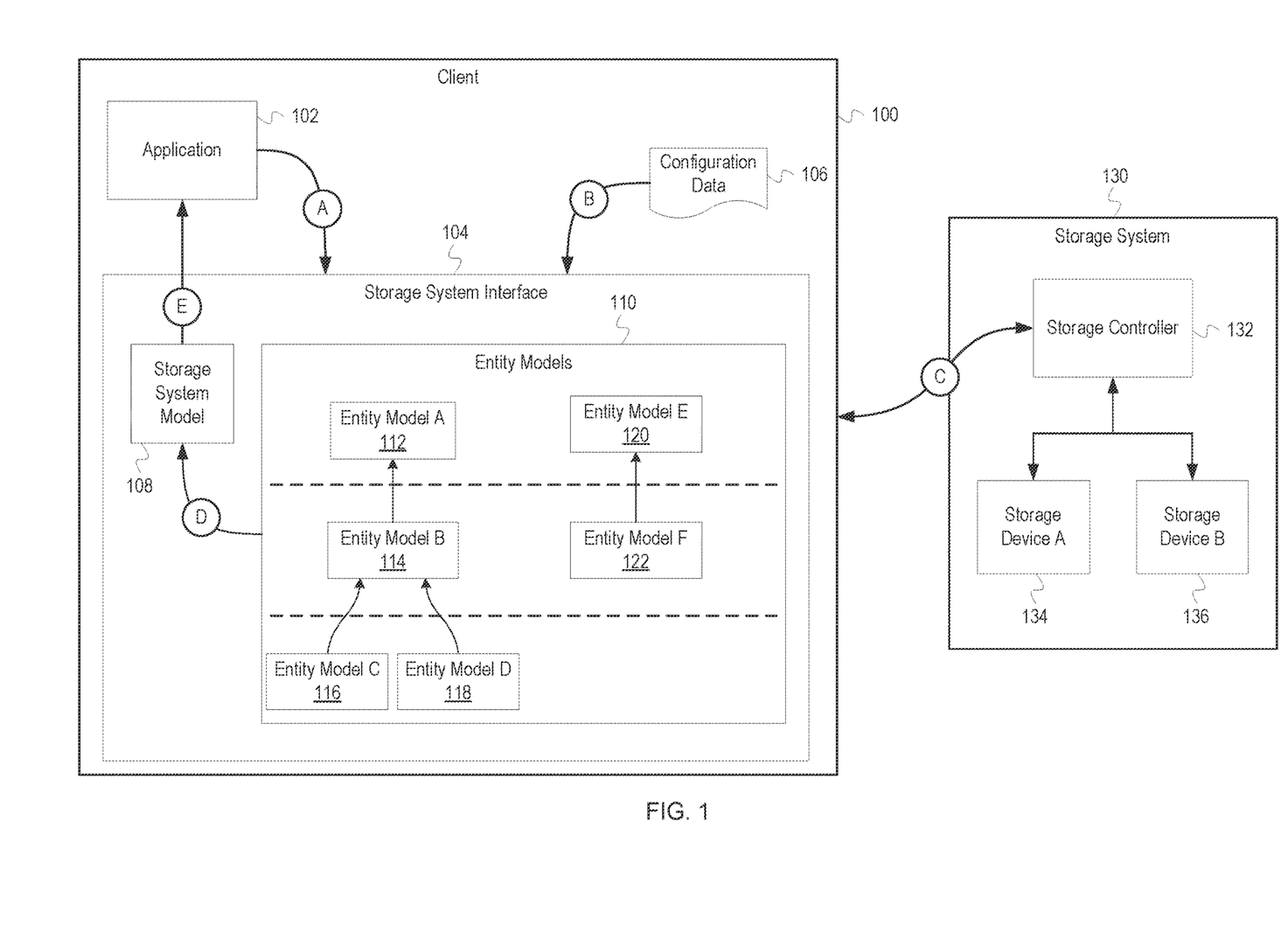
FIG. 1 depicts example operations of a storage system interface and entity models.

FIG. 1 depicts example operations of a storage system interface and entity models. FIG. 1 depicts a client 100 and a storage system 130. The client 100 includes an application 102, a storage system interface 104, and configuration data 106. The storage system interface 104 includes a storage system model 108 and a set of entity models 110. The storage system 130 includes a storage controller 132 and two storage devices (storage device A 134 and storage device B 136).

The entity models 110 represent two hierarchies of entity models. The first hierarchy includes entity model A 112, entity model B 114, entity model C 116, and entity model D 118. Entity model A 112 is the parent of entity model B 114 and entity model B 114 is the parent of both entity model C 116 and entity model D 118. The second hierarchy includes entity model E 120 and entity model F 122. Entity model E 120 is the parent of entity model F 122. Generally, the lower in the hierarchy, the more specific the entity model is. For example, entity model A 112 may represent a generic storage device, entity model B 114 may represent a block storage device, and entity model C 116 may represent a storage device from a particular manufacturer. As used herein, the term "parent entity model" refers to any entity model higher in an entity model hierarchy than the subject entity model and "child entity model" refers to any entity model lower in the entity model hierarchy than the subject entity model.

At stage A, the storage system interface 104 receives a request to generate the storage system model 108 from the application 102. The request can take several forms. For example, the storage system interface 104 may be configured to generate the storage system model 108 when the storage system interface 104 is instantiated. Thus, the request to generate the storage system model 108 may be implicit in a request to instantiate the storage system interface 104. The request may also be an explicit request to generate the storage system model 108. For example, the application 102 may call a particular function associated with the storage system interface 104. In some instances, the request can be a request for a storage system At stage B, the storage system interface 104 reads the configuration data 106. The configuration data 106 can be read from local or remote storage associated with the client 100. The configuration data 106 may be stored at a predetermined location or the location may be specified by the application 102. In some instances, the application 102 may pass the configuration data 106 to the storage system interface 104 as a parameter.

At stage C, the storage system interface 104 identifies one or more components of the storage system 130. In particular, the storage system interface 104 identifies components that will be used to initially generate the storage system model 108. The particular components identified can vary between implementations. For example, in some implementations the storage system interface 104 may identify all identifiable components of the storage system 130. In such an implementation, the storage system interface 104 can generate a complete storage system model 108. In some implementations, the storage system interface 104 may identify a subset of identifiable components. In such implementations, the storage system interface 104 may generate a partial storage system model 108 and add components from the storage system 130 to the storage system model 108 as they are requested by the application 102.

The particular technique used to identify the components can vary. The request received at stage A or the configuration data 106 may identify the storage system 130. The storage system 130 can be identified based on an identifier, such as an IP address. The storage system identifier may be the identifier of a primary storage controller (e.g., the storage controller 132), a managing node, etc. Once the storage system interface 104 determines the storage system identifier, the storage system interface 104 can query the storage system 130 for data identifying the individual components of the storage system 130. For example, the storage system interface 104 may query the storage controller 132, storage device A 134, and storage device B 136. In some instances, the storage system interface 104 may query a particular component for data associated with other components. For example, the storage system interface 104 might query the storage controller 132 for data associated with storage device A 134 and storage device B 136.

At stage D, the storage system interface 104 identifies the entity models associated with the storage system components identified at stage C and adds the entity models to the storage system model 108. For example, the storage system interface 104 may map metadata associated with the storage controller 132, such as manufacturer and model, to entity model C 116. The storage system interface 104 may use a mapping table, a database, or other data source to identify an entity model associated with a particular component.

Once the storage system interface 104 identifies the entity models, the storage system interface 104 instantiates the entity models and adds the entity models to the storage system model 108. Entity models in the storage system model 108 can be indexed and/or accessed using a unique identifier associated with the corresponding component. Thus, subsequent requests from the application 102 to the storage system interface 104 can include the unique identifier, which can be used to identify the corresponding entity model in the storage system model 108.

At stage E, one or more of the instantiated entity models is provided to the application 102. The storage system interface 104 may provide the entire storage system model 108 to the application. In some instances, the storage system interface 104 may provide the application 102 with a "root" entity model from which other entity models can be determined. For example, an entity model corresponding to the storage controller 132 might include functionality that allows the application 102 to request entity models corresponding to components coupled with the storage controller 132 (e.g., storage device A 132 and storage device B 136).

Once the storage system interface 104 provides an entity model to the application 102, the application 102 may perform operations related to the corresponding storage system component through the entity model. For example, if the storage system interface 104 provided the application 102 with an entity model corresponding to storage device A 134, the application 102 may call a "write" function on the entity model, which may result in data being written to storage device A 134.

As described above, the storage system interface 104 may provide a subset of the storage system model 108 to the application 102, such as a "root" entity model. In such instances, the application 102 may request additional entity models. For example, if the storage system interface 104 provided an entity model corresponding to the storage controller 132, the application 102 may request entity models for all storage devices coupled with the storage controller 132. The storage system interface 104 can provide the requested entity models to the application 102. Thus, the storage system interface 104 may provide entity models to the application 102 on an on-demand basis. Relatedly, the storage system interface 104 may generate additional entity models of the storage system model 108 when those particular entity models are requested.

Although depicted separate from the application 102, the storage system interface 104 can be incorporated within the application 102 (e.g., as a dynamically or statically linked library). Additionally, the storage system model 108 and/or entity models 110 can be separate from the storage system interface 104 instead of incorporated as part of the storage system interface 104. Further, the client 100 can be incorporated into the storage system 130 itself. For example, the storage system 130 may include a primary storage controller (e.g., the storage controller 132) or a manager node that provides an interface for managing the storage system 130. The management interface can utilize the storage system interface in a manner similar to that of the application 102.

Figure 2:
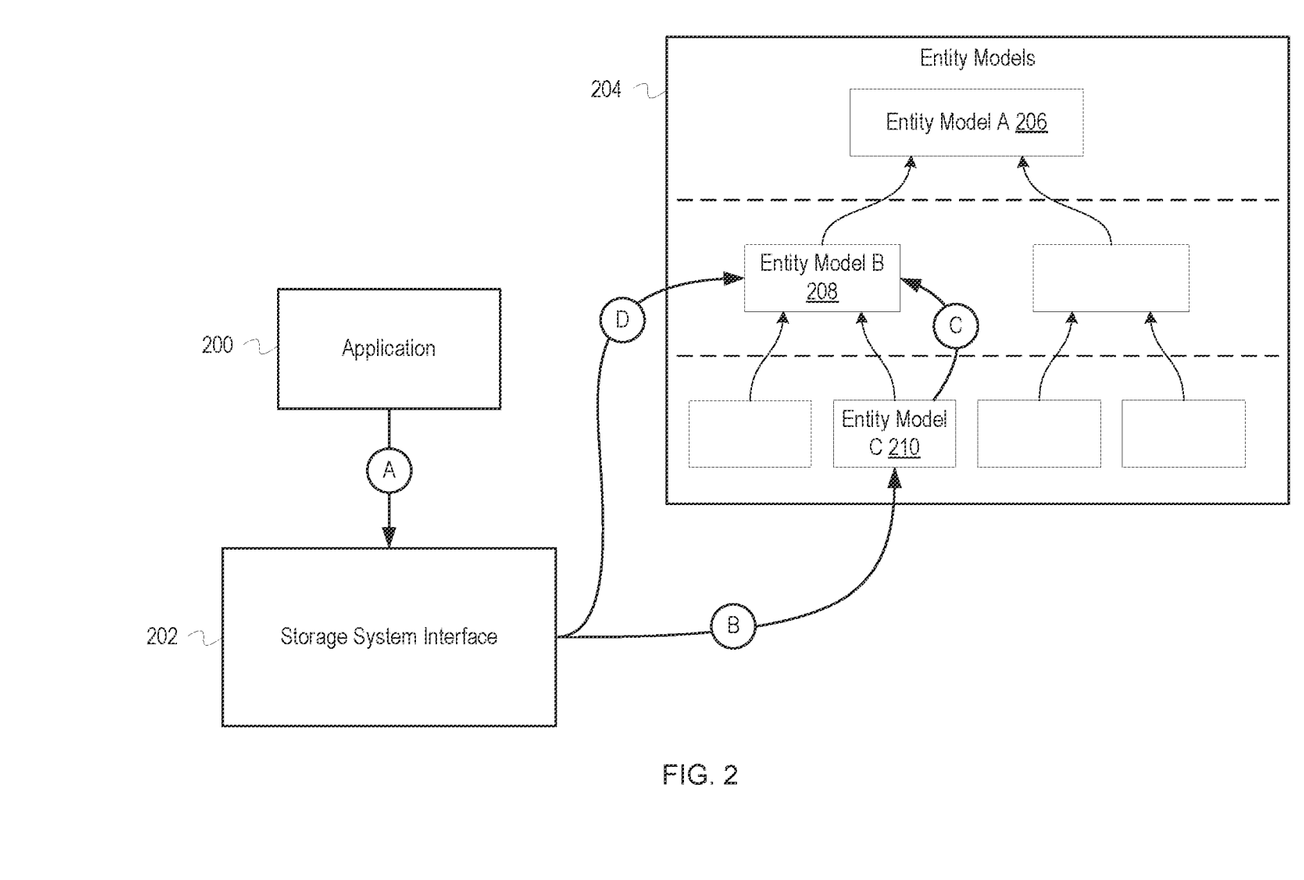
FIG. 2 depicts example operations for determining an entity model that implements requested functionality.

FIG. 2 depicts example operations for determining an entity model that implements requested functionality. Figure depicts an application 200, a storage system interface 202, and entity models 204. The entity models 204 include a hierarchy of entity models, including entity model A 206, entity model B 208, and entity model C 210. Entity model A 206 is the parent of entity model B 208 and entity model B 208 is the parent of entity model C 210.

At stage A, the storage system interface 202 receives a request from the application 200 specifying functionality associated with entity model C 210. The request may be in the form of a function call, operation identifier, etc., and may be a request for a particular operation to be performed, a request for an attribute associated with a storage system component corresponding to entity model C 210, etc. The functionality may be defined in one of the parent entity models (entity model B 208 or entity model A 206). However, if the application 200 is working with entity model C 210, the application 200 may not be aware that the functionality is not directly defined by entity model C 210.

At stage B, the storage system interface 202 determines whether entity model C 210 implements the requested functionality. For example, the storage system interface 202 may access metadata associated with entity model C 210 to determine whether entity model C 210 implements a function with the same name as a function requested by the application 200. In this example, the storage system interface 202 determines that entity model C 210 does not implement the requested functionality, and thus proceeds to stage C. If the storage system interface 202 determined that entity model C 210 implemented the requested functionality, the storage system interface 202 would have performed operations similar to those discussed at stage D, but corresponding to entity model C 210 instead of entity model B 208.

At stage C, the storage system interface 202 identifies entity model B 208 as the parent of entity model C 210 and determines whether entity model B 208 implements the requested functionality. The storage system interface 202 can utilize metadata associated with entity model C 210 to identify entity model B 208 as the parent of entity model C 210. The technique used to determine whether entity model B 208 implements the requested functionality can be substantially similar to that used to determine whether entity model C 210 implemented the requested functionality. In this example, the storage system interface 202 determines that entity model B 208 implements the requested functionality. If the storage system interface 202 determined that entity model B 208 did not implement the requested functionality, the storage system interface 202 would have proceeded up the hierarchy to entity model A 206 and performed similar operations.

At stage D, the storage system interface 202 assigns entity model B 208 to perform one or more operations associated with the requested functionality. For example, the storage system interface 202 may call a function corresponding to a function requested by the application 200.

Although FIG. 2 depicts the application 200 sending a request to the storage system interface 202, implementations can vary. For example, the application 200 may send the request directly to entity model C 210, which can determine whether it implements the functionality itself. If entity model C 210 determines that it does not implement the requested functionality, entity model C 210 can identify its parent and pass the request to the identified parent (e.g., entity model B 208). Additionally, in some implementations, functionality implemented in a parent entity model may be copied to a child entity model. Thus, for example, traversal of the hierarchy may be performed prior to receiving a request from the application 200, and functionality not implemented by entity model C 210 may be copied to entity model C 210 from entity model B 208.

Figure 3:
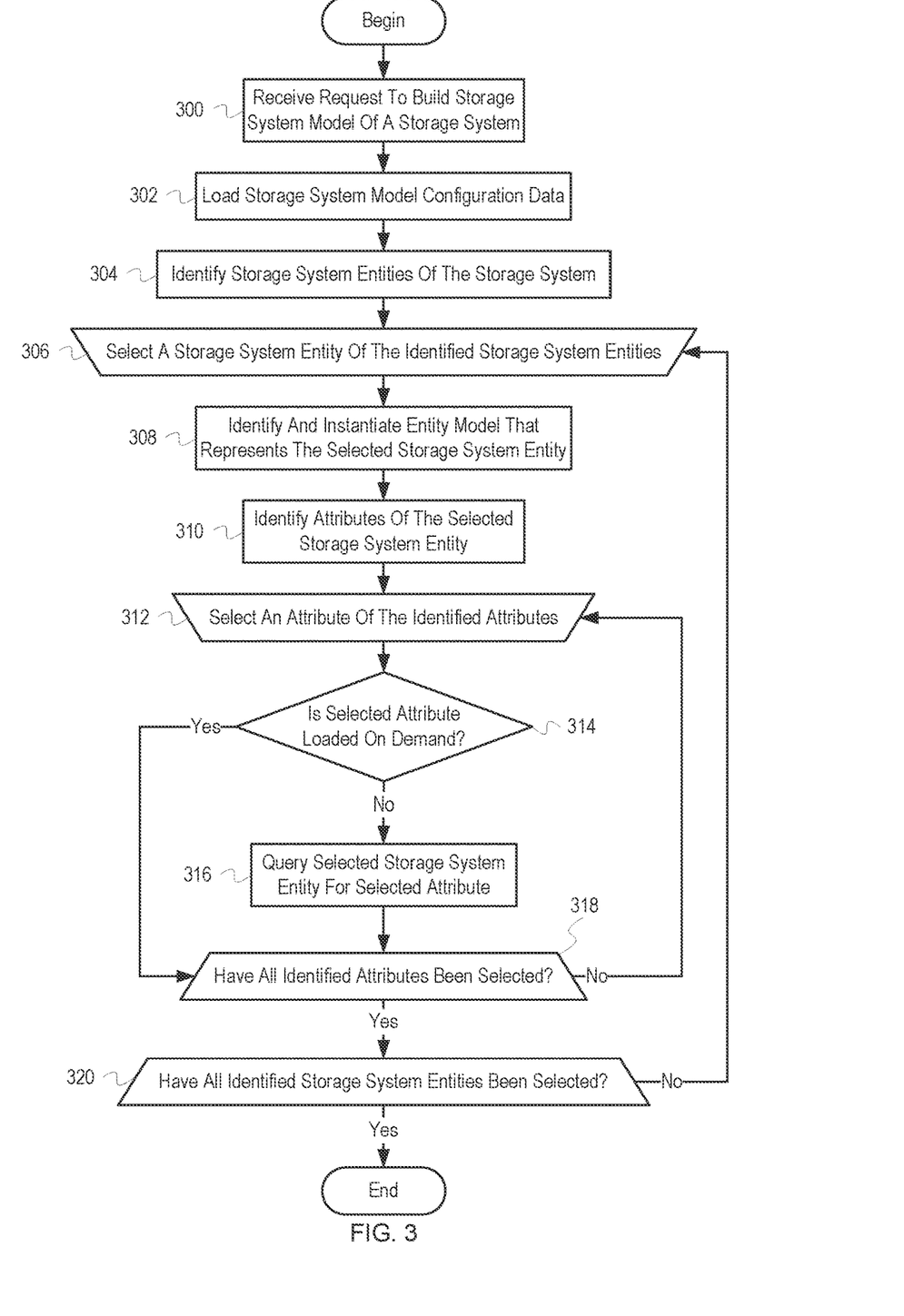
FIG. 3 depicts a flowchart of example operations for generating a storage system model.

FIG. 3 depicts a flowchart of example operations for generating a storage system model. The operations depicted in FIG. 3 can be performed by a storage system interface, such as storage system interface 104 of FIG. 1, or any suitable component.

At block 300, a storage system interface receives a request to generate a storage system model of a storage system. The request can be an explicit request to generate the storage system model or an implicit request. For example, the storage system interface may generate the storage system model in response to being instantiated. Thus, a request to instantiate the storage system interface may serve as a request to generate the storage system model. As another example, the storage system interface may receive a request to connect to a particular storage system entity of a storage system. If the storage system model is not already built (or should be rebuilt), the storage system interface can generate the storage system model in response to the request to connect to the storage system entity. After the storage system interface receives the request to generate the storage system model, control flows to block 302.

At block 302, the storage system interface loads storage system model configuration data ("configuration data"). The configuration data can be independent of the specific storage system for which the storage system model is being built, specific to the specific storage system, or a combination thereof. The configuration data can include data specifying whether attributes are loaded on demand, which storage system entities are initially included in the storage system model, mappings between storage system entities and entity models, etc. The configuration data may also include information identifying the storage system. The configuration data can be loaded from storage (local or remote), passed in with the request, etc. After the storage system interface loads the configuration data, control flows to block 304.

At block 304, the storage system interface identifies storage system entities of the storage system. In particular, the storage system interface identifies storage system entities to include in the storage system model. The storage system entities may include all storage system entities of the storage system or a subset of the storage system entities. For example, the storage system interface may generate a partial storage system model initially. The rest of the storage system model can be built as requests associated with other storage system entities are received. Typically, the storage system interface identifies at least one storage system entity (e.g., a primary storage controller, managing node, etc.).

The storage system interface can identify an initial storage system entity based on the request received at block 300, the configuration data loaded at block 302, etc. The storage system interface may identify additional storage system entities in the same manner. Additionally, the storage system interface can identify additional storage system entities by querying already identified storage system entities, querying a database of storage system entities, etc. As mentioned above, the configuration data can specify which storage system entities to load initially and which storage system entities to load on demand (if any). After the storage system interface identifies the storage system entities, control flows to block 306.

At block 306, the storage system interface selects a storage system entity of the identified storage system entities. On the first pass through block 306, the storage system interface selects an initial storage system entity. Control may flow back to block 306 from block 320. If control flows back to block 306 from block 320, the storage system interface selects a storage system entity that has not previously been selected. After the storage system interface selects a storage system entity, control flows to block 308.

At block 308, the storage system interface identifies an entity model that represents the selected storage system entity and instantiates the entity model. The particular mechanism used to identify the entity model can vary. For example, a data source (e.g., the configuration data, a database, etc.) may include mappings between storage system entities and entity models. The storage system interface can thus identify the entity model by finding the selected storage system entity in the mappings and identifying the corresponding entity model. The storage system interface may use data associated with the selected storage system entity to identify the entity model. For example, the storage system interface may query the selected storage system entity for metadata, such as a serial number, manufacturer identification, model identification, software version, etc. The storage system interface may then use the metadata to identify a mapping to an entity model. After identifying the entity model, the storage system interface instantiates the entity model. The specific mechanism used to instantiate the entity model can vary. For example, if the entity model is represented as a "class", the storage system interface may create an instance of an object corresponding to the class. If the entity model is represented as a "struct", the storage system interface may create a new struct. After the storage system interface has identified and instantiated an entity model, control flows to block 310.

At block 310, the storage system interface identifies attributes of the selected storage system entity. The attributes may be specified by the entity model, a database, the configuration data, etc. After the storage system interface identifies the attributes, control flows to block 312.

At block 312, the storage system interface selects an attribute of the identified attributes. On the first pass through block 312, the storage system interface selects an initial attribute. Control may flow back to block 312 from block 318. If control flows back to block 312 from block 318, the storage system interface selects an attribute that has not previously been selected. After the storage system interface selects the attribute, control flows to block 314.

At block 314, the storage system interface determines whether the selected attribute is loaded on demand. The storage system interface determines whether the selected attribute is loaded on demand based, at least in part, on the configuration data. As described above, the configuration data can identify attributes as being loaded on demand. The particular determination made by the storage system interface can vary depending on how the configuration data specifies attributes that are loaded on demand. For example, the configuration data may explicitly identify attributes that are loaded on demand. Alternatively, the configuration data may instead identify attributes that are not loaded on demand, thus implicitly identifying attributes that are loaded on demand. In the former example, the storage system interface determines whether the attribute is explicitly identified as being loaded on demand. In the latter example, the storage system interface determines whether the attribute is absent from the attributes that are not loaded on demand. If the storage system interface determines that the selected attribute is not loaded on demand, control flows to block 316. If the storage system interface determines that the selected attribute is loaded on demand, control flows to block 318.

At block 316, the storage system interface queries the selected storage system entity for the selected attribute. The particular technique used to query the selected storage system entity for the selected attribute can vary. For example, the storage system interface may use the Simple Network Management Protocol (SNMP), a software-defined networking application programming interface (API), etc. In some instances, the selected storage system entity may not be queried directly. Instead, the storage system interface may query another storage system entity, a database, etc. For example, the storage system interface may not have a communication path to a storage device. Thus, the storage system interface may query a storage controller coupled with the storage device instead. If the storage controller does not already have the attribute available, the storage controller may then query the storage device for the attribute. In some instances, even if the selected storage system entity can be queried, the selected storage system entity may not support querying for the particular attribute. Thus, the storage system interface may query a data source that includes the attribute, such as the configuration data or a database. The result of the query can vary depending on the query itself (e.g., whether the query was to a storage system entity, a database, etc.) After the storage system interface queries the selected storage system entity for the selected attribute, control flows to block 318.

At block 318, the storage system interface determines whether all of the identified attributes have been selected. If all of the identified attributes have been selected, control flows to block 320. If not all of the identified attributes have been selected, control flows back to block 312.

At block 320, the storage system interface determines whether all identified storage system entities have been selected. If all identified storage system entities have been selected, the process ends. If not all identified storage system entities have been selected, control flows back to block 306.

Although FIG. 3 depicts the storage system interface as identifying the storage system entities prior to generating the storage system model itself, the operations of the storage system interface can vary. In some instances, the storage system interface might identify storage system entities as the storage system model is being built. For example, the storage system interface may identify an initial storage system entity and instantiate the entity model for the initial storage system entity. After instantiating the entity model for the initial storage system entity, the storage system interface may query the initial storage system entity for storage system entities coupled with the initial storage system entity. The storage system interface can then instantiate the entity models corresponding to the storage system entities coupled with the initial storage system entity, repeating this process until the generation of the storage system model is complete.

Figure 4:
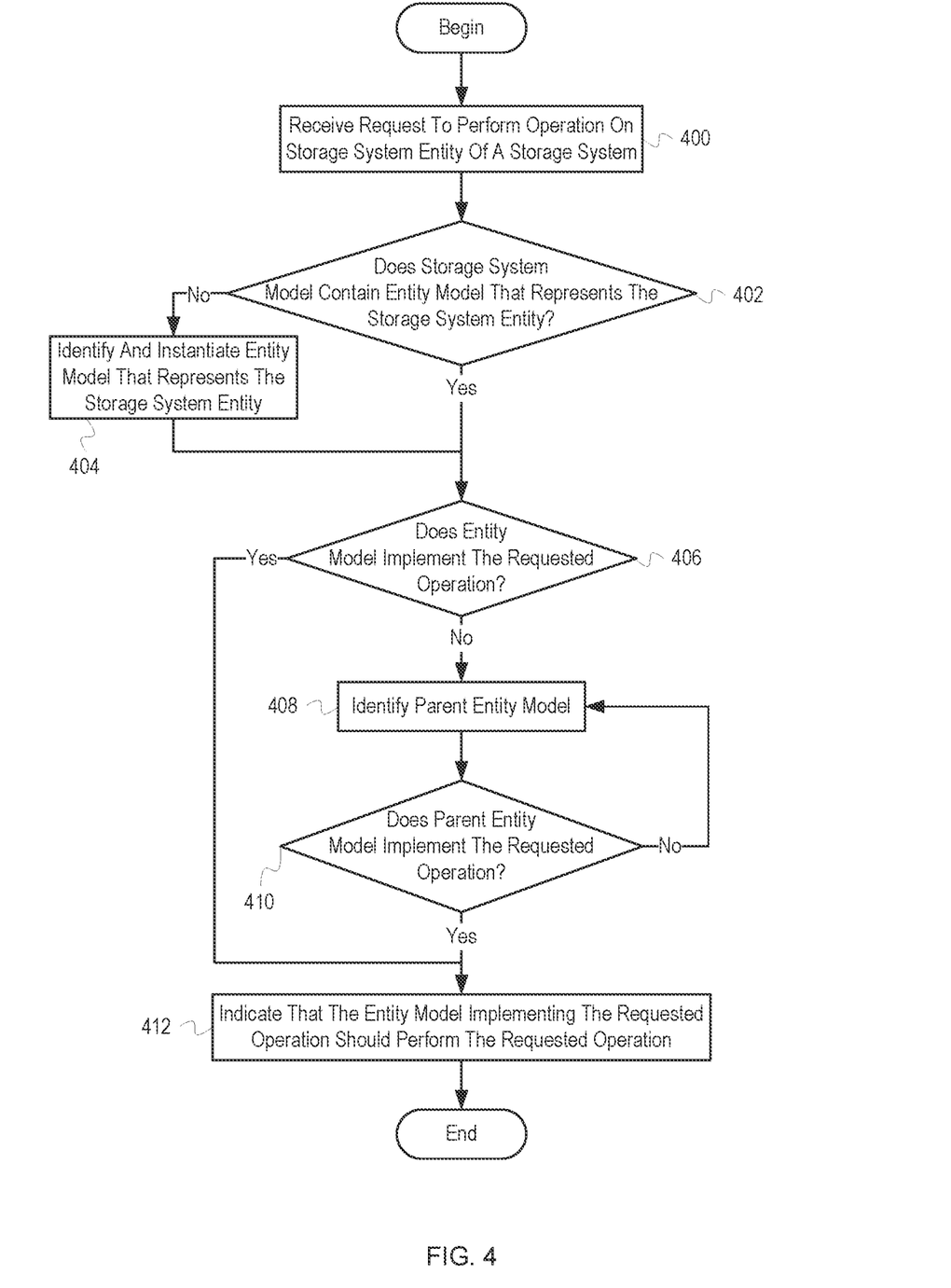
FIG. 4 depicts a flowchart of example operations for handling a request to perform an operation on a storage system entity.

FIG. 4 depicts a flowchart of example operations for handling a request to perform an operation on a storage system entity. The operations depicted in FIG. 4 can be performed by a storage system interface, such as the storage system interface 104 of FIG. 1, or any suitable component.

At block 400, a storage system interface receives a request to perform an operation on a storage system entity of a storage system. The manner in which the request is received can vary. For example, to connect to a storage system entity, a requesting component might call a particular function associated with the storage system interface and pass a storage system entity identifier to the function as a parameter. If an entity model corresponding to the storage system entity has already been instantiated, a requesting component may call a function associated with the entity model. As another example, a requesting component may pass a value that identifies the operation and a value that identifies the storage system entity to the storage system interface. The request may include additional parameters as well (e.g., a reference to data, a target storage location, etc.). After the storage system interface receives the request to perform the operation on the storage system entity, control flows to block 402.

At block 402, the storage system interface determines whether a model of the storage system includes an entity model that represents the storage system entity. In particular, the storage system interface determines whether the entity model has been previously instantiated (e.g., when the storage system model was built, in response to a request to connect to the storage system entity, etc.). If the storage system interface determines that the entity model has not been previously instantiated, control flows to block 404. If the storage system interface determines that the entity model has been previously instantiated, control flows to block 406.

At block 404, the storage system interface identifies and instantiates the entity model that represents the storage system entity. The operations performed at block 404 can be substantially similar to those performed at block 308 of FIG. 3. After the storage system interface identifies and instantiates the entity model that represents the storage system entity, control flows to block 406.

Control flowed to block 406 if it was determined, at block 402, that the storage system model included an entity model that represents the storage system entity. Control also flowed to block 406 from block 404. At block 406, the storage system interface determines whether the entity model implements the requested operation. To determine whether the entity model implements the requested operation, the storage system interface can use metadata associated with the entity model to determine whether the entity model implements a corresponding function. If the storage system interface determines that the entity model does not implement the requested operation, control flows to block 408. If the storage system interface determines that the entity model implements the requested operation, control flows to block 412.

At block 408, the storage system interface identifies a parent entity model of the entity model. To identify the parent entity model, the storage system interface can utilize metadata associated with the entity model. The metadata can identify any parent entity models that the entity model extends. Control can also flow to block 408 from block 410 if it is determined, at block 410, that the parent entity model does not implement the requested operation. If control flows to block 408 from block 410, the storage system interface identifies the parent entity model of the parent entity model identified during the previous pass through block 408. After the storage system interface identifies the parent entity model, control flows to block 410.

At block 410, the storage system interface determines whether the parent entity model implements the requested operation. To determine whether the parent entity model implements the requested operation, the storage system interface can use metadata associated with the parent entity model to determine whether the parent entity model implements a corresponding function. If the storage system interface determines that the parent entity model does not implement the requested operation, control flows back to block 408. If the storage system interface determines that the parent entity model implements the requested operation, control flows to block 412.

Control flowed to block 412 if it was determined, at block 406, that the entity model implements the requested operation. Control also flowed to block 412 if it was determined, at block 410, that the parent entity model implements the requested operation. At block 412, the storage system interface assigns the entity model to execute the requested operation. To assign the entity model to execute the requested operation, the storage system interface may call a function of the entity model associated with the operation, pass a value indicating the operation to the entity model, etc. After the storage system interface assigns the entity model to execute the requested operation, the process ends.

In some instances, an entity model may have multiple parent entity models. In such instances, the operations of FIG. 4 can be adapted to determine, at block 410, whether any of the parent entity models implement the requested operation. The operations at block 408 can also be adapted to find the parent entity models for each of the multiple parent entities.

The operations depicted at blocks 408 and 410 result in a traversal of all or a portion of the entity model hierarchy associated with the entity model that represents the storage system entity. In particular, the storage system interface traverses up the hierarchy, beginning with the entity model, until an entity model that implements the requested operation is found. In some instances, the hierarchy traversal may occur prior to receiving the request to perform the operation. For example, entity models may be predefined and passed through a compiler. If a particular entity model does not implement a method defined by a parent entity model, the compiler may copy the implementation from the parent entity model to the entity model. Thus, the compiler may effectuate the traversal of the hierarchy during compilation, which may increase performance of the storage system interface.

Figure 5:
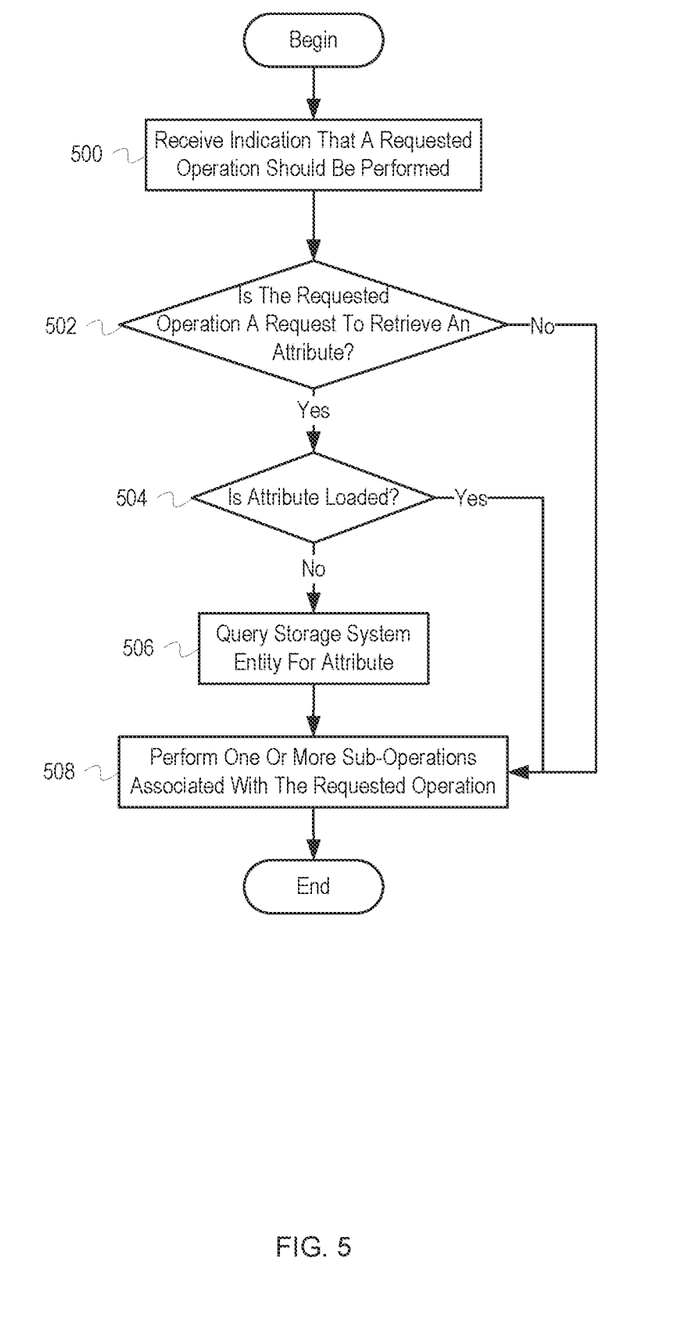
FIG. 5 depicts a flowchart of example operations for performing an operation on a storage system entity.

FIG. 5 depicts a flowchart of example operations for performing an operation on a storage system entity. The operations depicted in FIG. 5 can be performed by an entity model, such as entity model C 116 of FIG. 1, or any suitable component.

At block 500, an entity model receives an indication that a requested operation should be performed. The indication can be a requested operation identifier passed to the entity model, the calling of a particular function corresponding to the requested operation, etc. The indication can be associated with other parameters relevant to the requested operation. After the entity model receives the indication that the requested operation should be performed, control flows to block 502.

At block 502, the entity model determines whether the requested operation is a request to retrieve an attribute of the storage system entity. The entity model can determine whether the requested operation is a request to retrieve the attribute based on an operation identifier, based on the particular function called, etc. If the entity model determines that the requested operation is a request to retrieve the attribute, control flows to block 504. If the entity model determines that the requested operation is not a request to retrieve an attribute, control flows to block 508.

At block 504, the entity model determines whether the attribute is loaded. The entity model can determine whether the attribute is loaded by determining whether a variable or other data structure corresponding to the attribute has been initialized. The entity model may compare the data structure corresponding to the attribute with a predetermined default value (e.g., "null", −1, etc.). The entity model may also determine whether the attribute is loaded based on whether the entity model is in the process of being instantiated, based on configuration data, etc. If the entity model determines that the attribute is loaded, control flows to block 508. If the entity model determines that the attribute is not loaded, control flows to block 506.

At block 506, the entity model queries the storage system entity for the attribute. The operations performed at block 506 can be substantially similar to those performed at block 316 of FIG. 3. After the entity model queries the storage system entity for the attribute, control flows to block 508.

At block 508, the entity model performs one or more sub-operations associated with the requested operation. As described above, an entity model may map the requested operation to an encapsulated set of multiple sub-operations and execute the sub-operations as a single operation. For example, an entity model might present a write operation as a single function that takes a target storage location and data to write as parameters. However, when the function corresponding to the write operation is called, the entity model may perform multiple operations in order to effectuate the write operation. Thus, in response to an indication that a requested operation should be performed, the entity model performs one or more sub-operations. After the entity model performs the one or more sub-operations, the process ends.

In some instances, an entity model may not determine whether a requested operation is a request to retrieve an attribute. For example, if the indication that a requested operation should be performed is the calling of a function that corresponds to the particular operation, then no determination need be made, as the fact that the requested operation is a request to retrieve an attribute is inherent in the implementation of the function. In such instances, a function that does not retrieve an attribute may only include operations depicted at blocks 500 and 508.

Figure 6:
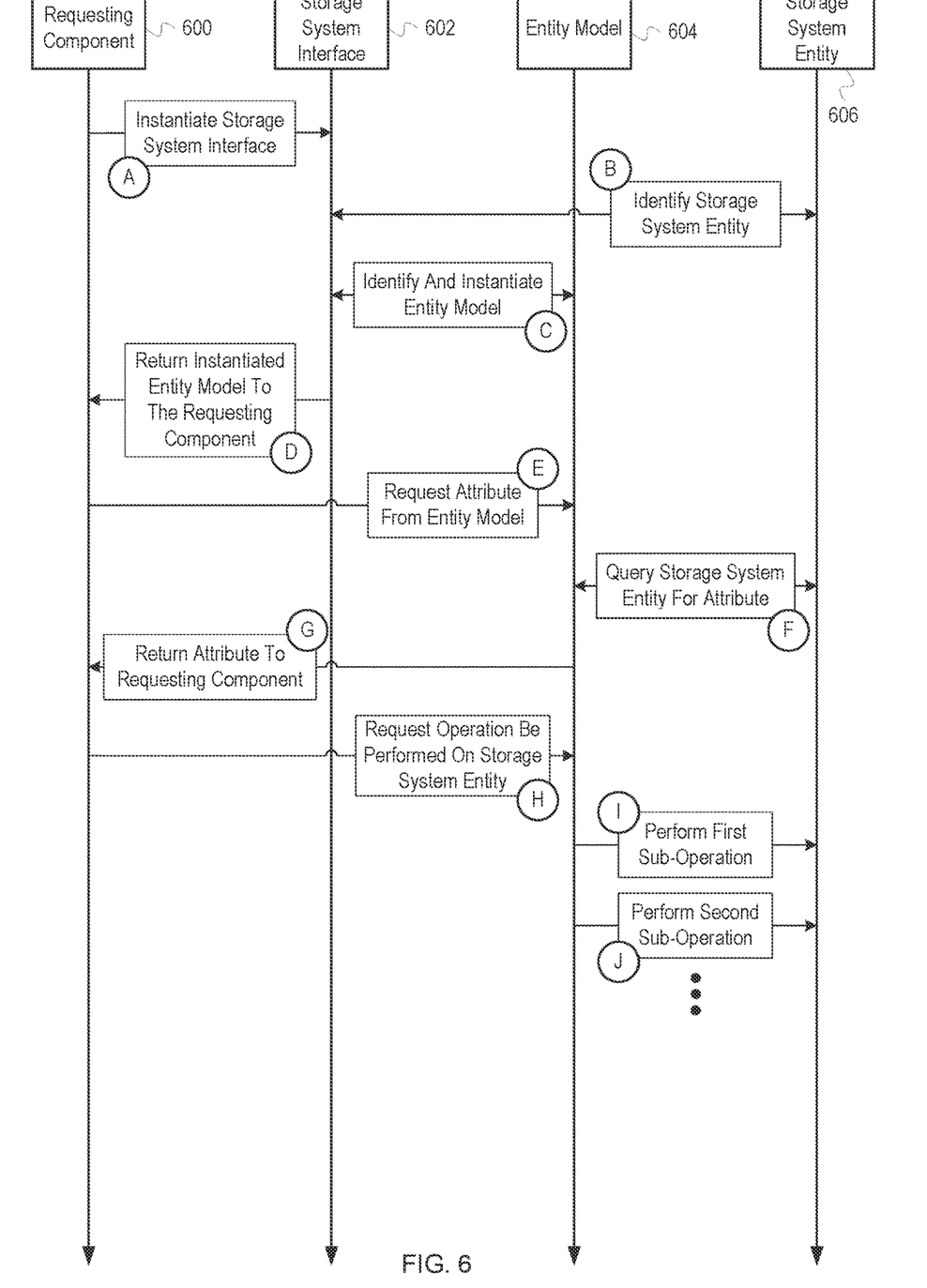
FIG. 6 depicts a sequence diagram of operations performed by a storage system interface and related components.

FIG. 6 depicts a sequence diagram of operations performed by a storage system interface and related components. FIG. 6 depicts a requesting component 600 (e.g., an application), a storage system interface 602, an entity model 604, and a storage system entity 606. Stages A through J depict operations performed by the components and can include communications and delegation of control between components.

At stage A, the requesting component instantiates the storage system interface 602. Instantiation may include requesting that a runtime environment instantiate an object associated with the storage system interface 602. Control may be passed to the runtime environment and/or the storage system interface 602, either or both of which may be responsible for instantiating the storage system interface 602. For example, the runtime environment may instantiate a base object representing the storage system interface 602. The runtime environment may then call a particular function associated with the object that completes the instantiation of the storage system interface 602.

At stage B, the storage system interface 602 identifies the storage system entity 606. Identification of the storage system entity 606 can occur as part of the instantiation of the storage system interface 602. To identify the storage system entity 606, the storage system interface 602 may send one or more queries to the storage system entity 606. In response to the queries, the storage system entity 606 may send a response that includes data responsive to the query. For example, the storage system interface 602 may send a query requesting a manufacturer identifier, a model identifier, and a serial number from the storage system entity 606. In response, the storage system entity 606 can send the requested data back to the storage system interface 602.

At stage C, the storage system interface 602 identifies and instantiates the entity model 604, which corresponds to (or represents) the storage system entity 606. The identification of the entity model 604 can be based, at least in part, on the data received by the storage system interface 602 at stage B. The instantiation of the entity model 604 can be similar to the instantiation of the storage system interface 602. For example, the storage system interface 602 may request that the runtime environment instantiate a base object corresponding to the entity model 604, and the runtime environment can call a function associated with the base object to complete instantiation of the entity model 604. When instantiation of the entity model 604 is complete, the instantiated entity model 604 may be returned to the storage system interface 602 and associated with a storage model (not depicted).

At stage D, the storage system interface 602 returns the instantiated entity model 604 to the requesting component 600. Depending on the particular implementation, the instantiated entity model 604 can be returned as the response to the instantiation of the storage system interface 602 at stage A or in addition to returning the storage system interface 602.

At stage E, the requesting component 600 requests an attribute from the entity model 604. To request an attribute, the requesting component 600 may call a particular function associated with the entity model 604.

At stage F, the entity model 604 queries the storage system entity 606 for the attribute. The entity model 604 may query the storage system entity 606 for the attribute if the entity model 604 determines that the attribute is loaded on demand, may be out of date, etc. In response to the query, the storage system entity 606 returns the attribute to the entity model 604.

At stage G, the entity model 604 returns the attribute to the requesting component.

At stage H, the requesting component 600 requests that an operation be performed on the storage system entity. To request that the operation be performed, the requesting component 600 can call a function associated with the entity model 604 that corresponds to the particular operation.

At stages I and J, the entity model 604 performs one or more sub-operations in response to receiving the request to perform the operation. In particular, the sub-operations effectuate the operation requested by the requesting component 600.

Variations

The particular configuration of a storage system interface, storage system model, and entity models can vary. For example, the storage system interface can include the entity models and/or the storage system model, or the entity models and/or the storage system model can be independent of the storage system interface. Some of this variation can occur based on the environment and technology used to create the storage system interface and related components. For example, if a compiled programming language is used, the entity model hierarchy may be traversed during compilation instead of when a request is received. Relatedly, some of the functionality of the storage system interface may be implemented by a runtime environment (i.e., the runtime environment may be considered part of the storage system interface). For example, if written using the Java® programming language, the Java Runtime Environment may be responsible for receiving requests from a requesting component and identifying the particular entity model object that implements the requested functionality. Thus, while the examples described above may illustrate various embodiments, they do not attempt to capture all possible variations, which may be driven by the particular environment the storage system interface is designed for.

Similarly, the storage systems that a storage system interface can interface with can vary as well. For example, although the storage system 130 depicted in FIG. 1 is fairly simple, the storage system interface 104 can be adapted to a storage system with multiple storage controllers, additional storage devices, and other components. Similarly, a storage system interface can be adapted to interface with a clustered storage system that includes multiple nodes (e.g., each node may be similar to the storage system 130) or a cloud-based storage system. When adapted to interface with a clustered storage system, a storage system interface can provide similar functionality by providing a consistent interface even when variations exist among the underlying nodes of the clustered storage system. Similarly, when adapted to interface with a cloud-based storage system, a storage system interface can provide a consistent interface between various cloud-based storage system providers, facilitating the use of disparate cloud-based storage system providers in a single storage system. Storage system interfaces are not limited to interfacing with a single type of storage system. Instead, a storage system interface can be designed to interface with an on-premises storage system, a remote clustered storage system, and a cloud-based storage system, thus allowing a client to take advantage of the different types of storage systems without all of the complexity that might be encountered by supporting disparate storage systems.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 408 and 410 may not be performed in some implementations. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
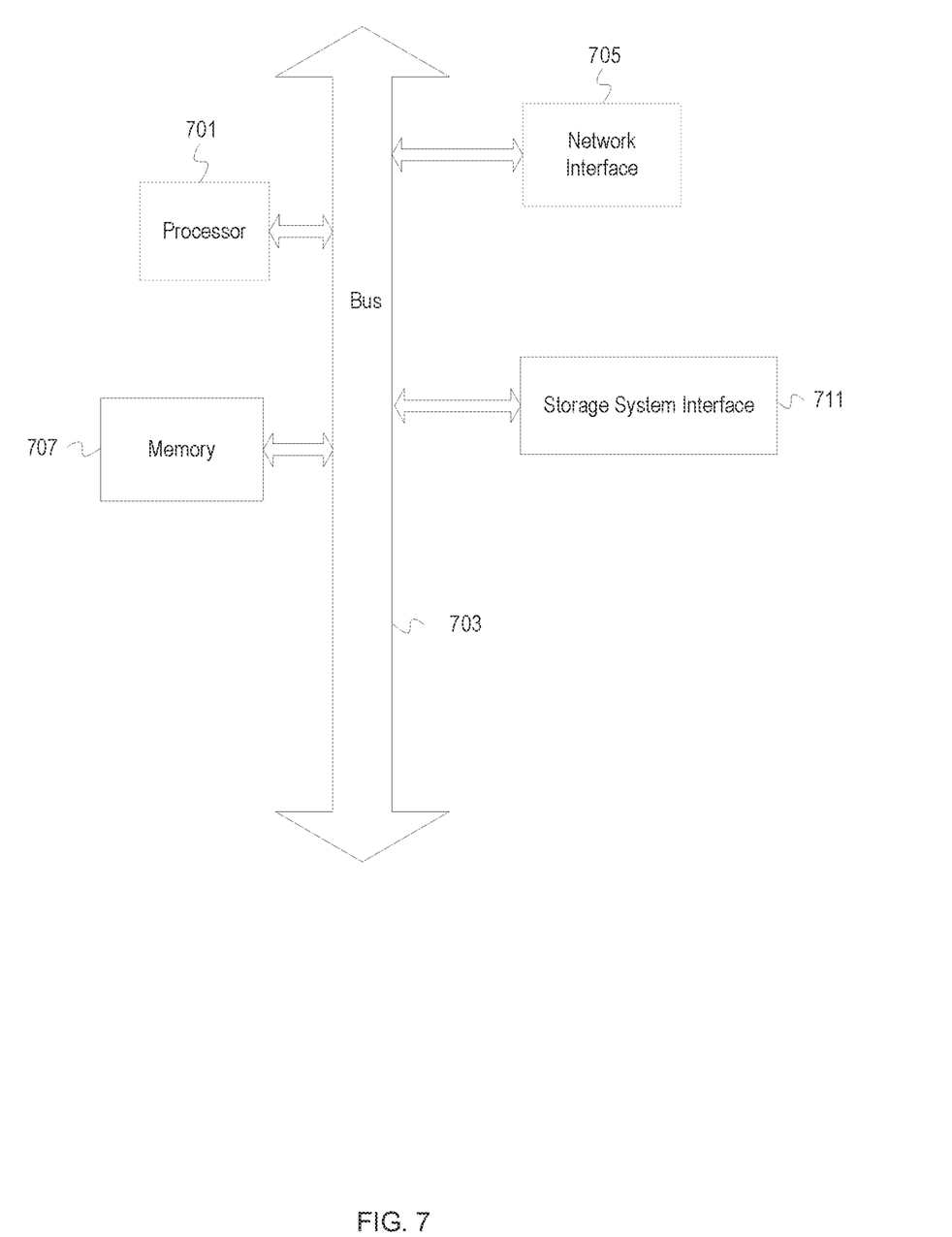
FIG. 7 depicts a computer system with a storage system interface.

FIG. 7 depicts an example computer system with a storage system interface. The computer system includes a processor 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, Hyper-Transport®, bus, InfiniBand® bus, NuBus, etc.) and a network interface 705 (e.g., a Fiber Channel interface, an Ethernet interface, an internet small computer system interface, SONET interface, wireless interface, etc.). The system also includes a storage system interface 711. The storage system interface 711 includes functionality for generating a storage system model, including identifying entity models associated with storage system entities and facilitating operations associated with a storage system. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for facilitating the operation of a storage system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
detecting that an operation identifier passed by a function call to an entity model is an indication that a requested operation is to be performed;
evaluating the operation identifier of the function call to the entity model to determine that the requested operation is to retrieve an attribute;
comparing, using the entity model, a variable data structure corresponding to the attribute with a predetermined default value to determine whether the attribute has been initialized;
in response to determining that the attribute has not been initialized, querying a storage system entity to retrieve the attribute; and
in response to the entity model mapping the requested operation to an encapsulated set of multiple sub-operations, executing the set of multiple sub-operations as a single operation utilizing the attribute.

2. The method of claim 1, comprising:
determining whether the attribute has been initialized based upon whether the entity model is in the process of being instantiated.

3. The method of claim 1, comprising:
evaluating configuration data to determine whether the attribute is loaded; and
in response to the configuration data indicating that the attribute is loaded, determining that the attribute has been initialized.

4. The method of claim 1, wherein the request operation is a write operation, and the method comprising:
presenting, using the entity model, the write operation as a single function that takes a target storage location and data to write as parameters.

5. The method of claim 4, comprising:
in response to the single function, corresponding to the write operation, being called, executing, by the entity model, the set of multiple sub-operations to implement the write operation.

6. The method of claim 1, comprising:
determining, by the entity model, that a first indication of a first requested operation is calling a function to retrieve the attribute as being inherent in the implementation of the function; and
executing a first set of multiple sub-operations as a first single operation for the first requested operation.

7. The method of claim 6, comprising:
in response to determining, by the entity model, that the first indication of the first requested operation is calling the function to retrieve the attribute, refraining from retrieving the attribute.

8. A system comprising:
a requesting component that instantiates a storage system interface;
the storage system interface that identifies and instantiates an entity model based upon a storage system entity identified by the storage system interface;
the entity model that queries the storage system entity for an attribute in response to receiving a request for the attribute from the requesting component, wherein the entity model returns the attribute to the requesting component; and
the storage system entity upon which the entity model executes a plurality of sub-operations of an operation requested by the requesting component for execution upon the storage system entity.

9. The system of claim 8, wherein the storage system interface returns the entity model to the request component in response to the entity model being instantiated.

10. The system of claim 8, wherein the storage system interface, a storage system model, and a plurality of entity models are hosted on a client.

11. The system of claim 10, wherein a storage system, comprising one or more components identified by the storage system interface for generating the storage system model, is hosted remote to the client.

12. The system of claim 8, wherein the storage system interface is configured to add components of a storage system to a storage system model by querying a storage controller and a storage device of the storage system.

13. The system of claim 12, wherein the entity model is added to the storage system model based upon the storage system interface mapping metadata associated with the storage controller to the entity model.

14. The system of claim 8, wherein the entity model is a root entity model of a hierarchy of entity models, and wherein the storage system interface provides entity models from the hierarchy of entity models to an application on-demand.

15. A non-transitory machine readable medium comprising instructions for performing a method, which when executed by a machine, causes the machine to:
detect that an operation identifier passed by a function call to an entity model is an indication that a requested operation is to be performed;
evaluate the operation identifier of the function call to the entity model to determine that the requested operation is to retrieve an attribute;
compare, using the entity model, a variable data structure corresponding to the attribute with a predetermined default value to determine whether the attribute has been initialized;
in response to determining that the attribute has not been initialized, query16 a storage system entity to retrieve the attribute; and
in response to the entity model mapping the requested operation to an encapsulated set of multiple sub-operations, execute the set of multiple sub-operations as a single operation utilizing the attribute.

16. The non-transitory machine readable medium of claim 15, wherein the instructions cause the machine to:
determine whether the attribute has been initialized based upon whether the entity model is in the process of being instantiated.

17. The non-transitory machine readable medium of claim 15, wherein the instructions cause the machine to:
evaluate configuration data to determine whether the attribute is loaded; and
in response to the configuration data indicating that the attribute is loaded, determine that the attribute has been initialized.

18. The non-transitory machine readable medium of claim 15, wherein the request operation is a write operation and wherein the instructions cause the machine to:
present, using the entity model, the write operation as a single function that takes a target storage location and data to write as parameters.

19. The non-transitory machine readable medium of claim 18, wherein the instructions cause the machine to:
in response to the single function, corresponding to the write operation, being called, execute, by the entity model, the set of multiple sub-operations to implement the write operation.

20. The non-transitory machine readable medium of claim 15, wherein the instructions cause the machine to:
determine, by the entity model, that a first indication of a first requested operation is calling a function to retrieve the attribute as being inherent in the implementation of the function; and
execute a first set of multiple sub-operations as a first single operation for the first requested operation.

\* \* \* \* \*